(12) United States Patent
Kim

(10) Patent No.: US 6,937,601 B2
(45) Date of Patent: Aug. 30, 2005

(54) APPARATUS AND METHOD FOR DELAY BOUND WEIGHTED ROUND ROBIN CELL SCHEDULING IN ASYNCHRONOUS TRANSFER MODE SWITCH

(75) Inventor: Dae Sik Kim, Seoul (KR)

(73) Assignee: UTStarcom, Inc., Alameda, CA (US)

( * ) Notice: Subject to any disclaimer, the term of this patent is extended or adjusted under 35 U.S.C. 154(b) by 840 days.

(21) Appl. No.: 09/973,855

(22) Filed: Oct. 9, 2001

(65) Prior Publication Data

US 2002/0064161 A1 May 30, 2002

(30) Foreign Application Priority Data

Oct. 9, 2000 (KR) .......................................... 2000-59217

(51) Int. Cl.$^7$ ............................................. H04L 12/56
(52) U.S. Cl. ............................. 370/395.41; 370/395.42
(58) Field of Search ......................... 370/395.4–395.43, 370/395.71, 412, 230.1

(56) References Cited

U.S. PATENT DOCUMENTS

| | | | | | |
|---|---|---|---|---|---|
| 6,028,843 | A | * | 2/2000 | Delp et al. | 370/395.42 |
| 6,229,812 | B1 | * | 5/2001 | Parruck et al. | 370/395.71 |
| 6,389,019 | B1 | * | 5/2002 | Fan et al. | 370/395.42 |
| 6,556,572 | B1 | * | 4/2003 | Ishida | 370/395.41 |
| 6,859,432 | B2 | * | 2/2005 | Nishimura et al. | 370/230.1 |

* cited by examiner

Primary Examiner—Duc Ho
Assistant Examiner—Phuongchau Ba Nguyen
(74) Attorney, Agent, or Firm—McDonnell Boehnen Hulbert & Berghoff LLP

(57) ABSTRACT

An apparatus and method for DBWRR (Delay Bound Weighted Round Robin) cell scheduling in an ATM (Asynchronous Transfer Mode) switch. More particularly, the present invention provides an apparatus and method for DBWRR cell scheduling in a high-speed ATM switch which can meet requirements for a cell transfer delay of real-time traffic in the ATM switch and minimize a processing overhead of the switch.

19 Claims, 6 Drawing Sheets

[ATM SWITCH]

[ATM SWITCH]

(a)  (b)

(c)  (d)

APPARATUS AND METHOD FOR DELAY BOUND WEIGHTED ROUND ROBIN CELL SCHEDULING IN ASYNCHRONOUS TRANSFER MODE SWITCH

CROSS REFERENCE TO RELATED APPLICATIONS

This application claims priority from Korean Application No. 2000-59217, filed Oct. 9, 2000, which is hereby incorporated by reference.

BACKGROUND OF THE INVENTION

1. Field of the Invention

The present invention relates in general to an apparatus and method for DBWRR (Delay Bound Weighted Round Robin) cell scheduling in an ATM (Asynchronous Transfer Mode) switch, and more particularly to an apparatus and method for DBWRR cell scheduling in a high-speed ATM switch which can meet requirements for a cell transfer delay of real-time traffic in the ATM switch and minimize a processing overhead of the switch.

2. Description of the Related Art

Up until recently, because of economical and technical problems, little interest has been aroused in studies of provision of existing telephone-class voice and facsimile services, such as a POTS (Plain Old Telephone Service), over an ATM network.

Recently, however, with the development of an IMT-2000 system employing an ATM technique as its main technique, users, mostly business subscribers, have increasingly demanded an integrated solution capable of providing voice services integrated on an ATM WAN (Wide Area Network)/LAN (Local Area Network), resulting in studies being actively conducted of cell transfer over the ATM network.

For real-time services, such as a VTOA (Voice and Telephony over ATM) used in the IMT-2000 system, a cell is discarded just when a transfer delay thereof exceeds a predetermined maximum bound. In this regard, the cell transfer delay has a great effect on the quality of service.

For reference, in ITU-T (International Telecommunication Union-Telecommunication Sector) recommendation G.114, it is recommended that the maximum allowable delay time be about 150 ms with respect to connections under echo control and about 25 ms with respect to connections under no echo control.

Delay-sensitive traffic, more particularly voice traffic must satisfy the quality of service associated with the cell transfer delay ahead of other service qualities. This requirement must in turn be reflected on cell scheduling. Note that a relatively simple scheduling algorithm must be employed in that the ATM technique basically processes high-speed cells.

Conventional cell scheduling methods may roughly be classified into a WRR (Weighted Round Robin) cell scheduling method and a DRR (Deficit Round Robin) cell scheduling method.

With reference to FIGS. 2a and 2b, there is shown in block form the construction of a conventional DRR cell scheduling apparatus for implementation of the DRR cell scheduling method. As shown in these drawings, the conventional DRR cell scheduling apparatus comprises a plurality of input buffers 10 connected respectively to a plurality of connections i, a plurality of deficit counter (DC) storage tables 20 connected respectively to the input buffers 10, a queuing module 30, a multiplexer (Mux) 40, and an output buffer 50.

First, assume that a specific one of the input buffers 10, corresponding to a connection i as shown in FIG. 2a, is weighted "4", and has a deficit counter (DC) value initialized to "0" and only two cells currently stored therein.

As a result, the queuing module 30 services the two cells currently stored in the specific input buffer 10, subtracts the number of the serviced cells from the weight of the buffer and then stores the resulting value in a specific one of the DC storage tables 20, corresponding to the specific input buffer 10.

Then, the Mux 40 receives two output cells from the specific input buffer 10 and in turn transfers them to the output buffer 50.

On the other hand, if the specific input buffer 10 has five cells stored therein, which are greater in number than the set weight, and a DC value of "1", as shown in FIG. 2b, the queuing module 30 adds the DC value to the weight, services the five cells with the resulting value and then stores the remainder in the specific DC storage table 20. In FIG. 2b, the DC value "1" is again stored in the specific DC storage table 20.

However, the above-mentioned DRR cell scheduling method does not consider either a connection delay or cell loss. In this connection, the application of the DRR cell scheduling method to the VTOA of the IMT-2000 system disadvantageously necessitates the introduction of an algorithm considering data delays occurring during cell transfer, such as a packet fill delay (PFD), transfer delay and queuing delay, and an algorithm for discarding cells violating delay requirements.

Meanwhile, the conventional WRR cell scheduling method serves to schedule cells in each link on the basis of a weight predefined upon call establishment. Here, each weight is defined on the basis of an average data generation rate of an associated link, which can be obtained through a peak cell generation rate, average cell generation rate or etc.

However, the ATM cell scheduling in the above manner is desirable to guarantee the quality of service with respect to traffic with a constant cell generation rate, such as constant bit rate (CBR) traffic, but has difficulties in guaranteeing the quality of service and efficiently using a network bandwidth, with respect to traffic with an inconstant, or variable cell generation rate, such as variable bit rate (VBR) traffic.

Further in the above-mentioned WRR cell scheduling method, when a connection continuously transfers cells at a higher rate than an average transfer rate, it has an effect on the next connection, resulting in the lack of independence of each connection.

In brief, many studies have been made of the conventional WRR cell scheduling method and DRR cell scheduling method as mentioned above, in terms of fairness, or fair bandwidth allocation, but most of them have left the delay problem unnoticed and have been unable to readily implement the methods, leading to many difficulties in applying those methods to ATM services requiring real-time properties, such as the VTOA.

The conventional WRR cell scheduling method and DRR cell scheduling method have a further disadvantage in that they do not introduce a discard algorithm considering a delay parameter such as a cell transfer delay (CTD), so they cannot support the real-time VTOA service in an overload state of an output link when being applied to the ATM cell scheduling.

SUMMARY OF THE INVENTION

Therefore, the present invention has been made in view of the above problems, and it is an object of the present invention to provide an apparatus and method for DBWRR cell scheduling in an ATM switch which can meet requirements for a cell transfer delay of high-speed real-time traffic in the ATM switch and minimize a processing overhead of the switch.

In accordance with one aspect of the present invention, the above and other objects can be accomplished by the provision of an apparatus for DBWRR (Delay Bound Weighted Round Robin) cell scheduling in an ATM (Asynchronous Transfer Mode) switch, comprising a plurality of input buffers, each of the input buffers storing high-speed ATM cell groups in order; a queuing module for receiving high-speed ATM cells, grouping the received ATM cells according to scheduling cycles on a link basis and storing the resulting ATM cell groups in the input buffers; a plurality of ATM cell scheduling tables for storing and managing cell scheduling information about the ATM cell groups stored in corresponding ones of the input buffers; an ATM processor for processing and transferring the ATM cell groups stored in each of the input buffers on the basis of the cell scheduling information in each of the ATM cell scheduling tables, a preset weight, a delay time required by an earliest cell in a first one of the ATM cell groups stored in each of the input buffers and an allowable delay time required by each of the input buffers; a multiplexer connected in common to the input buffers for inputting a plurality of ATM cells from the input buffers and providing the inputted ATM cells as a single output signal; and an output buffer for inputting an ATM cell signal from the multiplexer and temporarily storing the inputted ATM cell signal for an output wait period of time.

In accordance with another aspect of the present invention, there is provided a method for DBWRR (Delay Bound Weighted Round Robin) cell scheduling in an ATM (Asynchronous Transfer Mode) switch, comprising the steps of (a) allowing a queuing module to receive high-speed ATM cells, group the received ATM cells according to scheduling cycles on a link basis and store the resulting ATM cell groups in a specific one of a plurality of input buffers; (b) allowing an ATM processor to store cell scheduling information about the ATM cell groups stored in the specific input buffer, in a specific one of a plurality of ATM cell scheduling tables, corresponding to the specific input buffer; (c) allowing the ATM processor to recognize the cell scheduling information about a first one of the ATM cell groups stored in the specific input buffer, from the specific ATM cell scheduling table; (d) allowing the ATM processor to calculate a delay time required by an earliest cell in the first ATM cell group stored in the specific input buffer and an allowable delay time required by the specific input buffer; (e) allowing the ATM processor to determine how to process cell transfer scheduling for the first cell group stored in the specific input buffer on the basis of the ATM cell scheduling information about the first cell group stored in the specific ATM cell scheduling table, the delay time required by the earliest cell in the first cell group and the allowable delay time required by the specific input buffer, and then process the cell transfer scheduling for the first cell group in accordance with the determination result; and (f) allowing the ATM processor to update the ATM cell scheduling information about the first cell group stored in the specific ATM cell scheduling table in such a manner that it is appropriate to a current cell group transfer process.

BRIEF DESCRIPTION OF THE DRAWINGS

The above and other objects, features and other advantages of the present invention will be more clearly understood from the following detailed description taken in conjunction with the accompanying drawings, in which:

FIG. 4b is a detailed diagram of the fifth step in FIG. 4a; and

DESCRIPTION OF THE PREFERRED EMBODIMENTS

Figure 1:
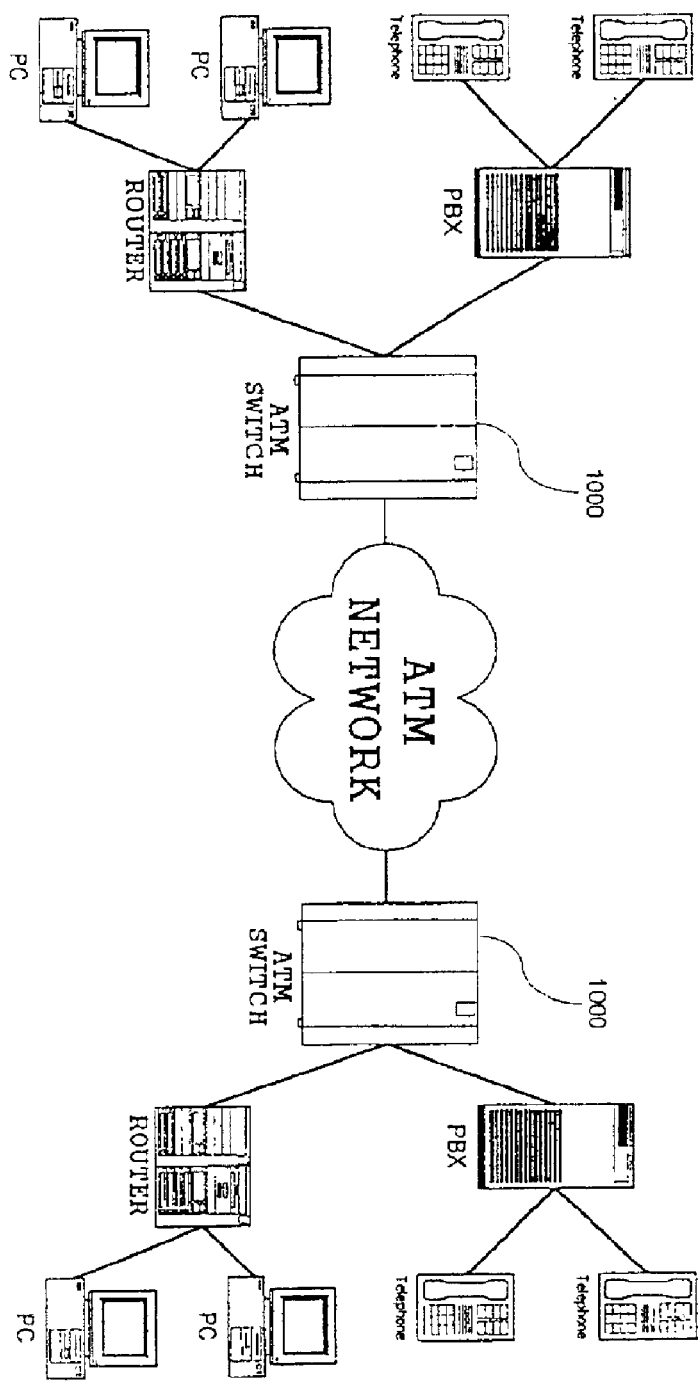
FIG. 1 is a view showing an ATM network environment of a general IMT-2000 system.
Figure 2A:
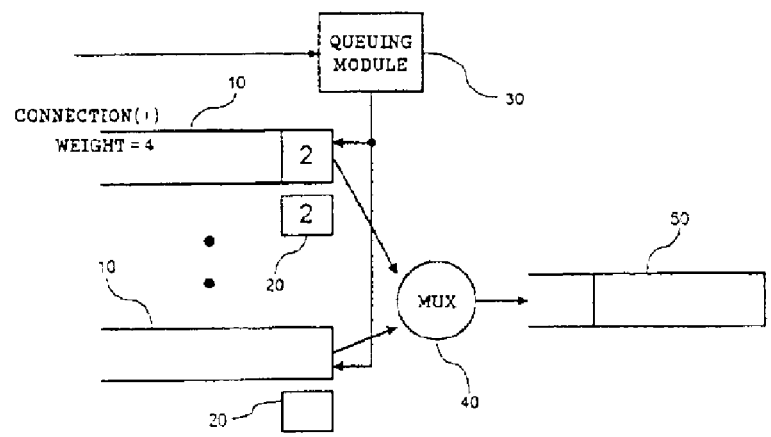
FIGS. 2a and 2b are block diagrams showing the construction of a conventional DRR cell scheduling apparatus.
Figure 2B:
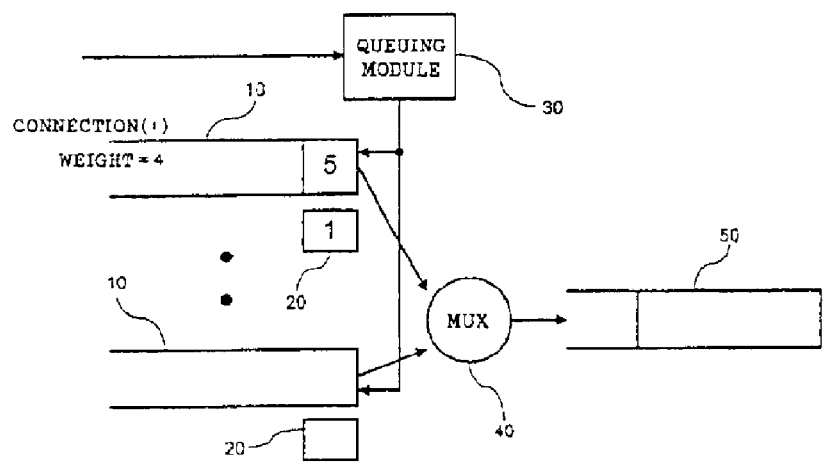
Figure 3:
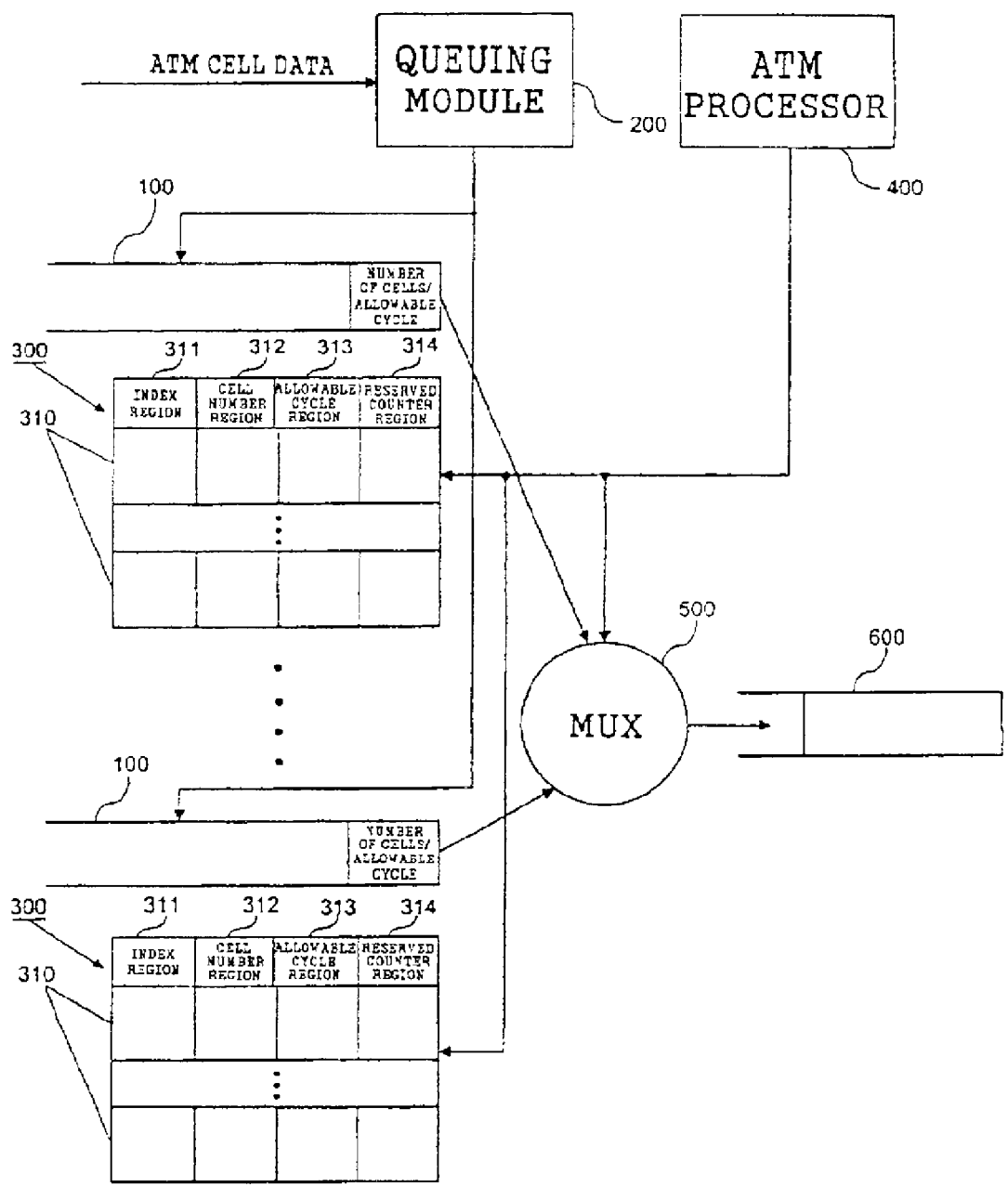
FIG. 3 is a block diagram showing the construction of an apparatus for DBWRR cell scheduling in an ATM switch in accordance with a preferred embodiment of the present invention.

With reference to FIG. 3, there is shown in block form the construction of an apparatus for DBWRR cell scheduling in an ATM switch in accordance with a preferred embodiment of the present invention. As shown in this drawing, the DBWRR cell scheduling apparatus comprises a plurality of input buffers 100, a queuing module 200, a plurality of ATM cell scheduling tables 300, an ATM processor 400, a Mux 500 and an output buffer 600.

The input buffers 100 are memories for storing high-speed ATM cell groups written by the queuing module 200 in order.

The queuing module 200 acts to receive high-speed ATM cells from a block just upstream of the system (for example, a switch or router), group the received ATM cells according to scheduling cycles on a link basis and store the resulting ATM cell groups in the input buffers 100. In the present embodiment, if time from one service reception to the next service reception in a connection i is defined as $RP_i$ (Round Robin Period), cells inputted to an associated input buffer within that time can be grouped into an $RP_i$-unit group. Here, the $RP_i$ is a variable parameter that is determined depending on the number of cells in an input buffer associated with each connection and a reserved counter value of the associated buffer.

The ATM cell scheduling tables 300 are allocated and connected respectively to the input buffers 100 to store and manage cell scheduling information about a plurality of ATM cell groups stored in corresponding ones of the input buffers 100. Each of the ATM cell scheduling tables 300 includes a plurality of ATM cell scheduling storage sections 310 as shown in FIG. 3.

Each of the ATM cell scheduling storage sections 310 in each of the ATM cell scheduling tables 300 functions to store and manage the cell scheduling information about an associated one of the ATM cell groups stored in a corresponding one of the input buffers 100. To this end, the ATM cell scheduling storage sections 310 each have an index region 311, cell number region 312, allowable cycle region 313 and reserved counter region 314.

In each of the ATM cell scheduling storage sections 310, the index region 311 stores a group number of cells grouped on the basis of $RP_i$, which number is an integer beginning with 1. The cell number region 312 stores the number of ATM cells in the associated ATM cell group stored in the corresponding input buffer 100. The allowable cycle region 313 stores a number of an allowable cycle of the associated ATM cell group in which the associated group must be processed. The reserved counter region 314 stores a reserved counter value $RC_j$ of the associated ATM cell group stored in the corresponding input buffer 100. The reserved counter value is a value indicative of arrival of the first cell of each group, which is used for calculation of a delay time of each group.

The ATM processor 400 acts to process the ATM cell groups stored in each of the input buffers 100 on the basis of the cell scheduling information in each of the ATM cell scheduling tables 300 and a preset weight $w_i$ to transfer them to the Mux 500.

The Mux 500 are connected in common to signal output terminals of the input buffers 100 to input a plurality of ATM cells from the input buffers 100 and provide the inputted ATM cells as a single output signal to the output buffer 600.

The output buffer 600 is a memory for inputting an ATM cell signal from the Mux 500 and temporarily storing the inputted ATM cell signal for an output wait period of time.

Next, a description will be given of a method for DBWRR cell scheduling in the ATM switch in accordance with the preferred embodiment of the present invention.

Figure 4A:
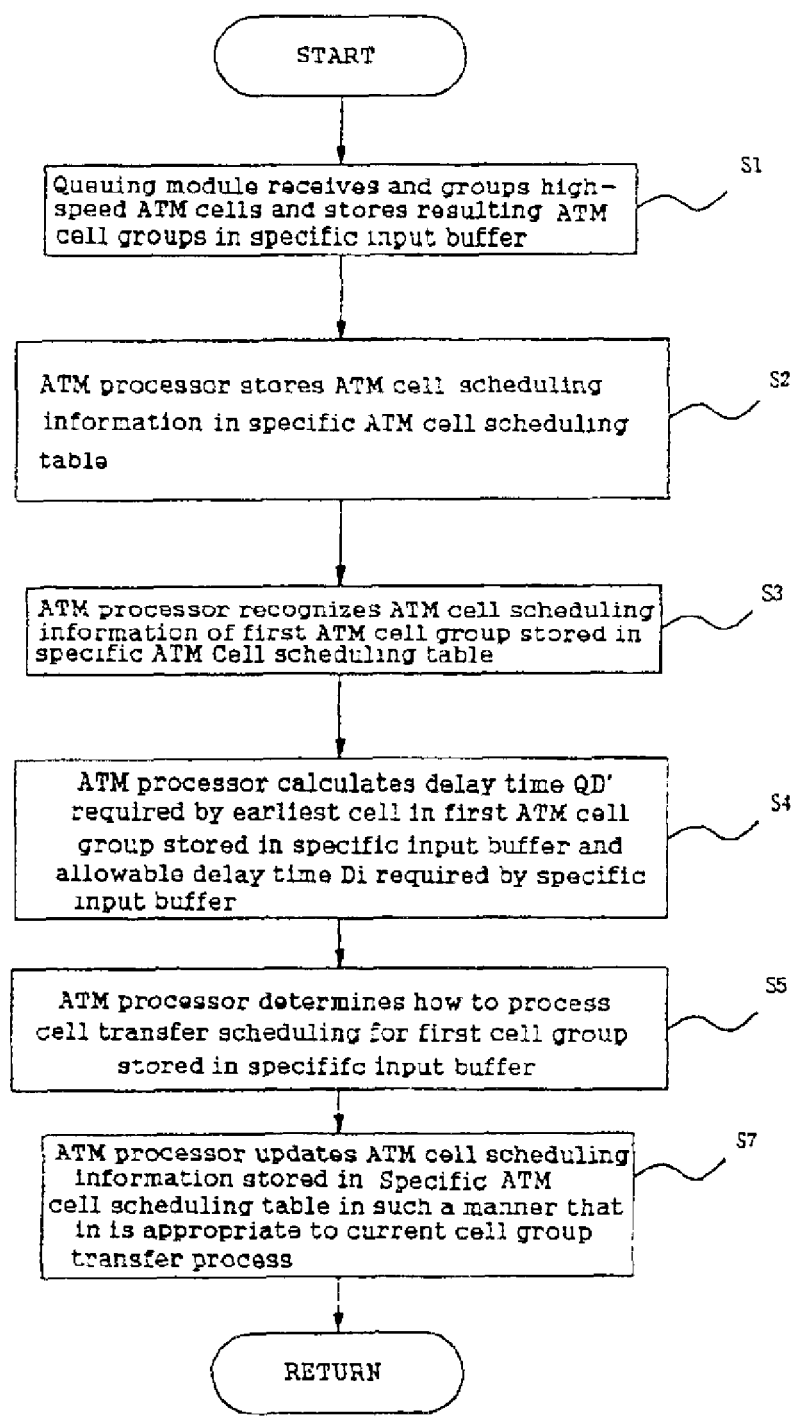
FIG. 4a is a flowchart illustrating a method for DBWRR cell scheduling in the ATM switch in accordance with the preferred embodiment of the present invention.
Figure 4B:
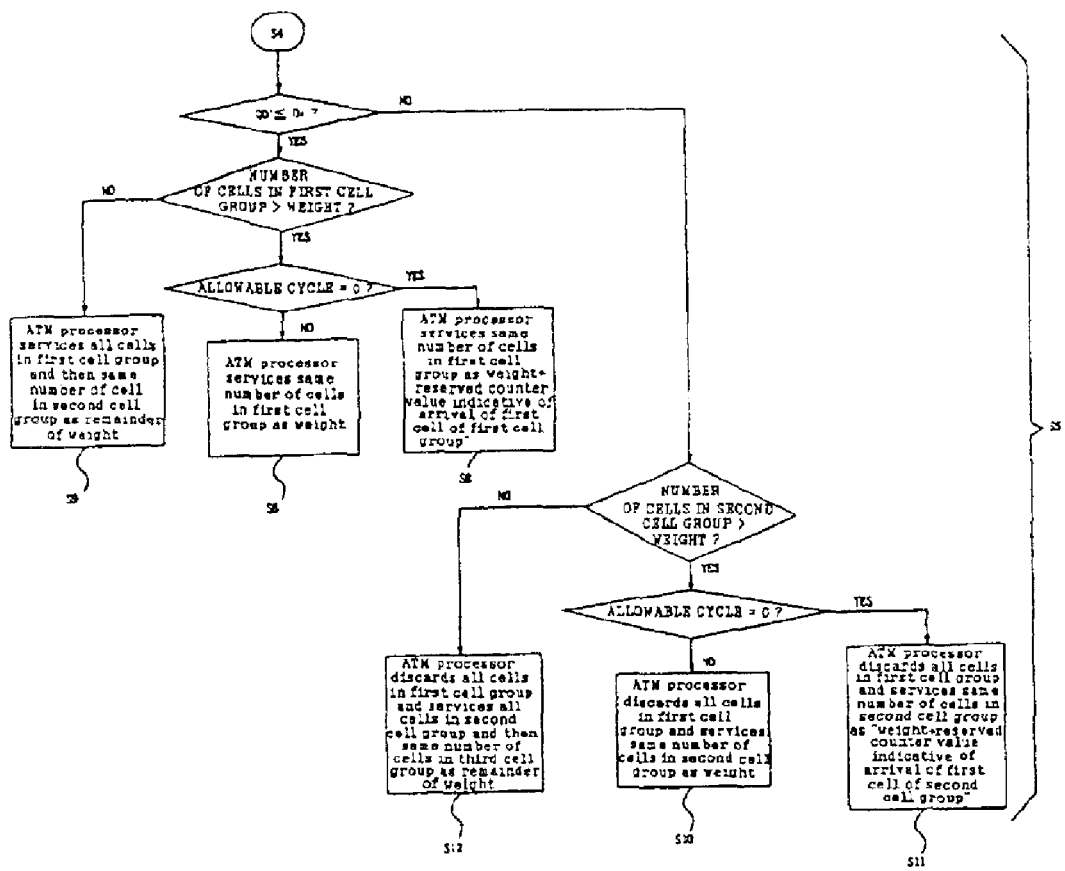

FIGS. 4a and 4b are flowcharts illustrating the method for DBWRR cell scheduling in the ATM switch in accordance with the preferred embodiment of the present invention, and FIGS. 5a to 5d are reference diagrams illustrating the method for DBWRR cell scheduling in the ATM switch in accordance with the preferred embodiment of the present invention.

The following description will be made for four cases as shown in FIGS. 5a to 5d, as examples, on the assumption that the allowable cycle $c_j$ of each cell group is "2" and the weight $w_i$ thereof is "4".

Upon receiving high-speed ATM cells from a block just upstream of the system, the queuing module 200 groups the received ATM cells according to scheduling cycles on a link basis and stores the resulting ATM cell groups in a specific one of the input buffers 100 (S1).

Figure 5:
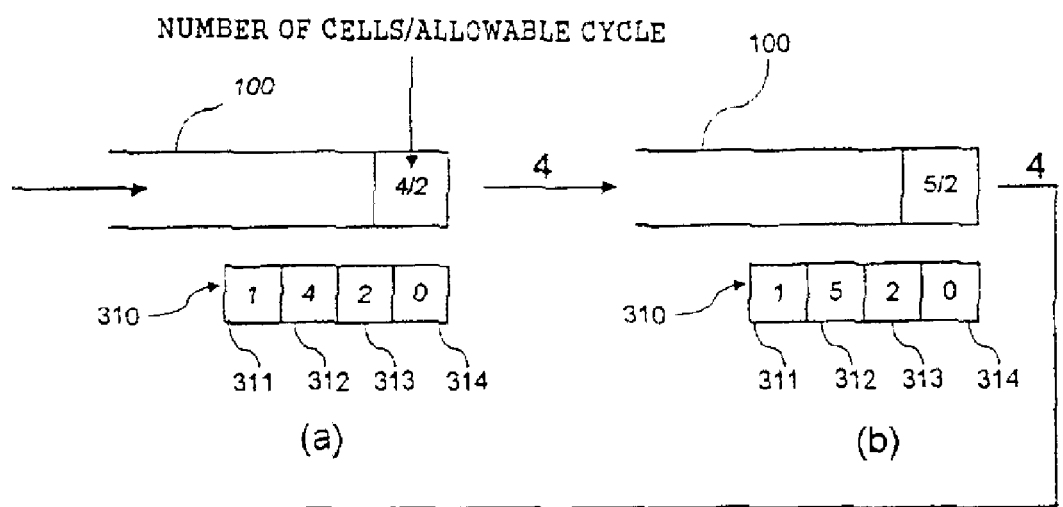
FIGS. 5a to 5d are reference diagrams illustrating the method for DBWRR cell scheduling in the ATM switch in accordance with the preferred embodiment of the present invention.
Figure 5:
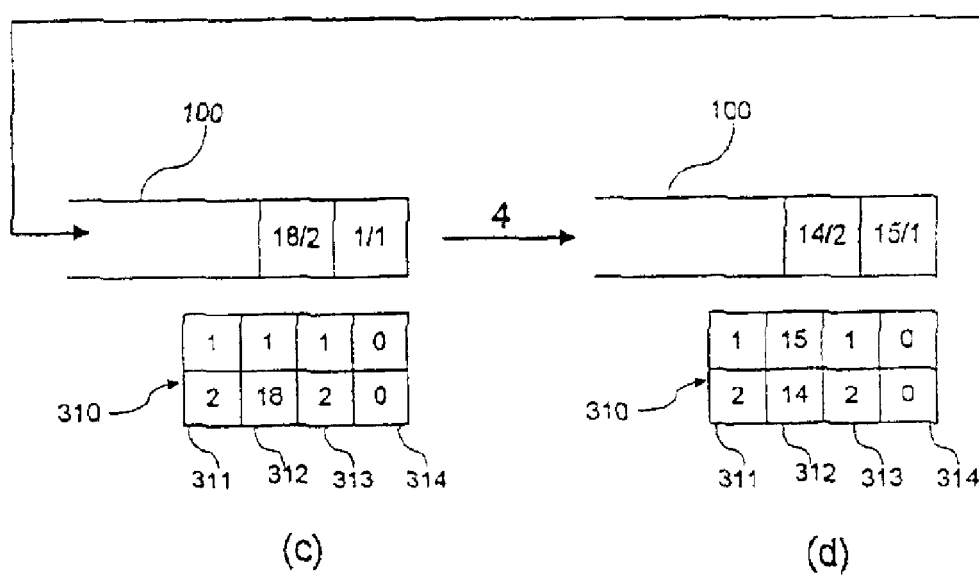

The ATM processor 400 stores the number of cells $n_j$ and allowable cycle $c_j$ of each of the ATM cell groups stored in the specific input buffer 100, and a reserved counter value $RC_j$ indicative of arrival of the first cell of each of the ATM cell groups, in a specific one of the ATM cell scheduling tables 300, corresponding to the specific input buffer 100 (S2). In FIG. 5a, the number of cells in the first cell group stored in the specific input buffer 100 is 4, the allowable cycle of the first cell group is "2" and the reserved counter value $RC_j$ corresponding to the first cell group is "0".

As a result, as shown in FIG. 5a, the ATM processor 400 writes "1" in the index region 311 of the first ATM cell scheduling storage section 310, "4" in the cell number region 312, "2" in the allowable cycle region 313 and "0" in the reserved counter region 314, respectively.

The ATM processor 400 then recognizes the number of cells $n_j$ and allowable cycle $c_j$ of the first ATM cell group stored in the specific input buffer 100, and the reserved counter value $RC_j$ indicative of arrival of the first cell of the first ATM cell group, from the cell scheduling information stored in the specific ATM cell scheduling table 300 (S3).

Thereafter, the ATM processor 400 calculates a delay time QD' required by the earliest cell in the first ATM cell group stored in the specific input buffer 100 on the basis of the below equation 1, and then an allowable delay time $D_i$ required by the specific input buffer 100 on the basis of the below equation 2 (S4):

$$QD' = (k-c_1)W - (RC-RC_1) \qquad \text{[Equation 1]}$$

where, k is a period in which cells in each ATM cell group must be processed, $c_1$ is an allowable cycle of a cell group being currently serviced, W is time (10δ) required in processing cells associated with weights of all input buffers, RC is a reserved counter value when each ATM cell group has arrived at a corresponding input buffer, and $RC_1$ is a reserved counter value when the first cell of each ATM cell group has arrived at a corresponding input buffer.

$$D_i = kW + \alpha \ (0 \leq \alpha \leq W) \qquad \text{[Equation 2]}$$

where, k is a period in which cells in each ATM cell group must be processed, and W is time (10δ) required in processing cells associated with weights of all input buffers.

Thereafter, the ATM processor 400 determines how to process cell transfer scheduling for a first one of the cell groups stored in the specific input buffer 100 on the basis of the ATM cell scheduling information about the first cell group stored in the specific ATM cell scheduling table 300, the delay time QD' required by the earliest cell in the first cell group and the allowable delay time $D_i$ required by the specific input buffer 100, and then processes the cell transfer scheduling for the first cell group in accordance with the determination result (S5 in FIG. 4a).

Where the delay time QD' required by the earliest cell in the first cell group is less than or equal to the allowable delay time $D_i$ required by the specific input buffer 100, the ATM processor 400 can process the cell transfer scheduling for the first cell group in consideration of the number, weight $w_i$ and allowable cycle $c_j$ of cells in the first cell group in the following manner.

First, in the case where the number of cells in the first cell group is greater than the weight $w_i$ and the allowable cycle $c_j$ of the first cell group is not "0", as shown in FIG. 5a, the ATM processor 400 transfers the same number of cells, or four cells, in the first cell group as the weight $w_i$ to the output buffer 600 via the Mux 500 (S6). As a result, all cells in the first cell group are serviced.

Subsequently, the ATM processor 400 updates the ATM cell scheduling information about the first cell group stored in the specific ATM cell scheduling table 300 in such a manner that it is appropriate to the current cell group transfer process (S7).

On the other hand, the queuing module 200 receives and groups high-speed ATM cells and again stores the resulting ATM cell groups in the specific input buffer 100 (S1).

The ATM processor 400 stores the number of cells $n_j$ and allowable cycle $c_j$ of each of the ATM cell groups stored in the specific input buffer 100, and a reserved counter value $RC_j$ indicative of arrival of the first cell of each of the ATM cell groups, in the specific ATM cell scheduling table 300 corresponding to the specific input buffer 100 (S2). In FIG. 5b, the number of cells in the first cell group stored in the specific input buffer 100 is 5, the allowable cycle of the first cell group is "2" and the reserved counter value $RC_j$ corresponding to the first cell group is "0".

Accordingly, as shown in FIG. 5b, the ATM processor 400 writes "1" in the index region 311 of the first ATM cell scheduling storage section 310, "5" in the cell number region 312, "2" in the allowable cycle region 313 and "0" in the reserved counter region 314, respectively.

Thereafter, the ATM processor 400 recognizes the number of cells $n_j$ and allowable cycle $c_j$ of the first ATM cell group stored in the specific input buffer 100, and the reserved counter value $RC_j$ indicative of arrival of the first cell of the first ATM cell group, from the cell scheduling information stored in the specific ATM cell scheduling table 300 (S3).

The ATM processor 400 then calculates a delay time QD' required by the earliest cell in the first ATM cell group stored in the specific input buffer 100 and an allowable delay time $D_i$ required by the specific input buffer 100 (S4).

Thereafter, the ATM processor 400 determines how to process cell transfer scheduling for a first one of the cell groups stored in the specific input buffer 100 on the basis of the ATM cell scheduling information about the first cell group stored in the specific ATM cell scheduling table 300, the delay time QD' required by the earliest cell in the first cell group and the allowable delay time $D_i$ required by the specific input buffer 100, and then processes the cell transfer scheduling for the first cell group in accordance with the determination result (S5).

Where cells arriving during the entire service cycle are grouped and the number of cells constituting a first one of the resulting cell groups is "5" as shown in FIG. 5b, the number of cells in the first cell group is greater than the weight $w_i$ and the allowable cycle $c_j$ of the first cell group is not "0", so the ATM processor 400 proceeds to step S6. At step S6, the ATM processor 400 transfers the same number of cells, or four cells, in the first cell group as the weight $w_i$ to the output buffer 600 via the Mux 500. As a result, in FIG. 5b, only "4" of the "5" cells are serviced, whereas "1" thereof remains as it is.

Subsequently, the ATM processor 400 updates the ATM cell scheduling information about the first cell group stored in the specific ATM cell scheduling table 300 in such a manner that it is appropriate to the current cell group transfer process, as in the first ATM cell scheduling storage section 310 as shown in FIG. 5c (S7).

Meanwhile, the queuing module 200 receives and groups high-speed ATM cells from a block just upstream of the system and again stores the resulting ATM cell groups in the specific input buffer 100 (S1).

The ATM processor 400 stores the number of cells $n_j$ and allowable cycle $c_j$ of each of the ATM cell groups stored in the specific input buffer 100, and a reserved counter value $RC_j$ indicative of arrival of the first cell of each of the ATM cell groups, in the specific ATM cell scheduling table 300 corresponding to the specific input buffer 100 (S2). In FIG. 5c, the number of cells in the first cell group stored in the specific input buffer 100 is 1, the allowable cycle of the first cell group is "1" and the reserved counter value $RC_j$ corresponding to the first cell group is "0".

As also seen from FIG. 5c, the number of cells in the second cell group stored in the specific input buffer 100 is 18, the allowable cycle of the second cell group is "2" and the reserved counter value $RC_j$ corresponding to the second cell group is "0".

Accordingly, as shown in FIG. 5c, the ATM processor 400 writes "2" in the index region 311 of the second ATM cell scheduling storage section 310, "18" in the cell number region 312, "2" in the allowable cycle region 313 and "0" in the reserved counter region 314, respectively.

Thereafter, the ATM processor 400 recognizes the number of cells $n_j$ and allowable cycle $c_j$ of each of the first and second ATM cell groups stored in the specific input buffer 100, and the reserved counter value $RC_j$ indicative of arrival of the first cell of each of the first and second ATM cell groups, from the cell scheduling information stored in the specific ATM cell scheduling table 300 (S3).

The ATM processor 400 then calculates a delay time QD' required by the earliest cell in the first ATM cell group stored in the specific input buffer 100 and an allowable delay time $D_i$ required by the specific input buffer 100 (S4).

Thereafter, the ATM processor 400 determines how to process cell transfer scheduling for a first one of the cell groups stored in the specific input buffer 100 on the basis of the ATM cell scheduling information about the first cell group stored in the specific ATM cell scheduling table 300, the delay time QD' required by the earliest cell in the first cell group and the allowable delay time $D_i$ required by the specific input buffer 100, and then processes the cell transfer scheduling for the first cell group in accordance with the determination result (S5).

In FIG. 5c, two groups exist. The first group has five original cells, four serviced and one remaining. The second group has a total of nineteen cells accumulated in the buffer, which are greater in number than the weight and all have QD' less than or equal to $D_i$. In this case, the ATM processor 400 services all cells in the first cell group and then the same number of cells in the subsequent cell group as the remainder of the weight $w_i$ (S9). As a result, in FIG. 5c, only "three" cells in the second cell group are serviced after the remaining "one" cell in the first cell group is serviced.

Thereafter, the ATM processor 400 updates the ATM cell scheduling information about the first cell group stored in the specific ATM cell scheduling table 300 in such a manner that it is appropriate to the current cell group transfer process, as in the first ATM cell scheduling storage section 310 shown in FIG. 5d (S7).

On the other hand, the queuing module 200 receives and groups high-speed ATM cells from a block just upstream of the system and again stores the resulting ATM cell groups in the specific input buffer 100 (S1).

The ATM processor 400 stores the number of cells $n_j$ and allowable cycle $c_j$ of each of the ATM cell groups stored in the specific input buffer 100, and a reserved counter value $RC_j$ indicative of arrival of the first cell of each of the ATM cell groups, in the specific ATM cell scheduling table 300 corresponding to the specific input buffer 100 (S2). In FIG. 5d, the number of cells in the first cell group stored in the specific input buffer 100 is 15, the allowable cycle of the first cell group is "1" and the reserved counter value $RC_j$ corresponding to the first cell group is "0".

As also seen from FIG. 5d, the number of cells in the second cell group stored in the specific input buffer 100 is 14, the allowable cycle of the second cell group is "2" and the reserved counter value $RC_j$ corresponding to the second cell group is "0". Thus, as shown in FIG. 5d, the ATM processor 400 writes "2" in the index region 311 of the second ATM cell scheduling storage section 310, "14" in the cell number region 312, "2" in the allowable cycle region 313 and "0" in the reserved counter region 314, respectively.

The ATM processor 400 then recognizes the number of cells $n_j$ and allowable cycle $c_j$ of each of the first and second ATM cell groups stored in the specific input buffer 100, and the reserved counter value $RC_j$ indicative of arrival of the first cell of each of the first and second ATM cell groups, from the cell scheduling information stored in the specific ATM cell scheduling table 300 (S3).

Thereafter, the ATM processor 400 calculates a delay time QD' required by the earliest cell in the first ATM cell group stored in the specific input buffer 100 and an allowable delay time $D_i$ required by the specific input buffer 100 (S4).

Subsequently, the ATM processor 400 determines how to process cell transfer scheduling for a first one of the cell groups stored in the specific input buffer 100 on the basis of the ATM cell scheduling information about the first cell group stored in the specific ATM cell scheduling table 300, the delay time QD' required by the earliest cell in the first cell group and the allowable delay time $D_i$ required by the specific input buffer 100, and then processes the cell transfer scheduling for the first cell group in accordance with the determination result (S5).

In FIG. 5d, two groups exist. Because the number of cells in the first cell group is greater than the weight $w_i$ and the allowable cycle of the first cell group is not "0", the ATM processor 400 proceeds to step S6 in FIG. 4b. At step S6, the ATM processor 400 services the same number of cells in the first cell group as the weight $w_i$. As a result, in FIG. 5d, only "four" cells in the first cell group are serviced.

Thereafter, the ATM processor 400 updates the ATM cell scheduling information about the first cell group stored in the specific ATM cell scheduling table 300 in such a manner that it is appropriate to the current cell group transfer process (S7).

A description will hereinafter be given of events other than the above-stated scheduling cases in conjunction with the eighth, tenth, eleventh and twelfth steps S8, S10, S11 and S12 in FIG. 4b.

At the eighth step S8, if it is determined at the above fifth step S5 that the number of cells in the first cell group is greater than the weight $w_i$ and the allowable cycle $c_j$ of the first cell group is "0", the ATM processor 400 transfers the same number of cells in the first cell group as "the weight $w_i$ +the reserved counter value $RC_j$ indicative of arrival of the first cell of the first cell group" to the output buffer 600 via the Mux 500 and then proceeds to the seventh step S7.

At the tenth step S10, if it is determined at the above fifth step S5 that the delay time QD' required by the earliest cell in the first cell group is greater than the allowable delay time $D_i$ required by the specific input buffer 100, the number of cells in the second cell group is greater than the weight $w_i$ and the allowable cycle $c_j$ of the second cell group is not "0", the ATM processor 400 discards all cells in the first cell group, transfers the same number of cells in the second cell group as the weight $w_i$ to the output buffer 600 via the Mux 500 and then proceeds to the seventh step S7.

At the eleventh step S11, if it is determined at the above fifth step S5 that the delay time QD' required by the earliest cell in the first cell group is greater than the allowable delay time $D_i$ required by the specific input buffer 100, the number of cells in the second cell group is greater than the weight $w_i$ and the allowable cycle $c_j$ of the second cell group is "0", the ATM processor 400 discards all cells in the first cell group, transfers the same number of cells in the second cell group as "the weight $w_i$+the reserved counter value $RC_j$ indicative of arrival of the first cell of the second cell group" to the output buffer 600 via the Mux 500 and then proceeds to the seventh step S7.

At the twelfth step S12, if it is determined at the above fifth step S5 that the delay time QD' required by the earliest cell in the first cell group is greater than the allowable delay time $D_i$ required by the specific input buffer 100 and the number of cells in the second cell group is smaller than or equal to the weight $w_i$, the ATM processor 400 discards all cells in the first cell group, services all cells in the second cell group and then the same number of cells in the third cell group as the remainder of the weight $w_i$ and then proceeds to the seventh step S7.

As apparent from the above description, the present invention provides an apparatus and method for DBWRR cell scheduling in an ATM switch which can group and manage cells inputted to input buffers on respective links according to ATM scheduling cycles on a link basis, thereby significantly reducing a processing overhead of the switch as compared with conventional WRR/DRR cell scheduling methods employing a cell-unit management technique.

Further, the present apparatus and method can discard cells that are stored in input buffers and wait therein for their output for more than a cell transfer delay time, so as to reduce the probability for other cells to violate cell transfer delay requirements, resulting in prevention of unnecessary waste of resources.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for DBWRR (Delay Bound Weighted Round Robin) cell scheduling in an ATM (Asynchronous Transfer Mode) switch, comprising:

a plurality of input buffers, each of said input buffers storing high-speed ATM cell groups in order;

a queuing module for receiving high-speed ATM cells, grouping the received ATM cells according to scheduling cycles on a link basis and storing the resulting ATM cell groups in said input buffers;

a plurality of ATM cell scheduling tables for storing and managing cell scheduling information about said ATM cell groups stored in corresponding ones of said input buffers;

an ATM processor for processing and transferring said ATM cell groups stored in each of said input buffers on the basis of the cell scheduling information in each of said ATM cell scheduling tables, a preset weight, a delay time required by an earliest cell in a first one of said ATM cell groups stored in each of said input buffers and an allowable delay time required by each of said input buffers;

a multiplexer connected in common to said input buffers for inputting a plurality of ATM cells from said input buffers and providing the inputted ATM cells as a single output signal; and an output buffer for inputting an ATM cell signal from said multiplexer and temporarily storing the inputted ATM cell signal for an output wait period of time.

2. The apparatus as set forth in claim 1, wherein each of said ATM cell scheduling tables includes a plurality of ATM cell scheduling storage sections, each of said ATM cell scheduling storage sections storing and managing said cell scheduling information about an associated one of said ATM cell groups stored in a corresponding one of said input buffers.

3. The apparatus as set forth in claim 2, wherein each of said ATM cell scheduling storage sections includes:

an index region for storing an index of a corresponding one of said ATM cell scheduling storage sections;

a cell number region for storing the number of ATM cells in the associated ATM cell group stored in the corresponding input buffer;

an allowable cycle region for storing a number of an allowable cycle of said associated ATM cell group stored in said corresponding input buffer; and a reserved counter region for storing a reserved counter value of said associated ATM cell group stored in said corresponding input buffer.

4. The apparatus as set forth in claim 1, wherein said ATM processor is adapted to, if said delay time required by said earliest cell in said first ATM cell group stored in each of said input buffers is less than or equal to said allowable delay time required by each of said input buffers, the number of cells in said first cell group is greater than said weight and an allowable cycle of said first cell group is not "0", transfer the same number of cells in said first cell group as said weight to said output buffer via said multiplexer.

5. The apparatus as set forth in claim 4, wherein said ATM processor is adapted to, if the number of cells in said first cell group stored in each of said input buffers is smaller than or equal to said weight, transfer all cells in said first cell group and then the same number of cells in a second one said ATM cell groups stored in each of said input buffers as a remainder of weight to said output buffer via said multiplexer.

6. The apparatus as set forth in claim 4, wherein said ATM processor is adapted to, if in said delay time required by said earliest cell in said first ATM cell group stored in each of said input buffers is greater then said allowable delay time required by each of said input buffers, the number of cells in a second one of said ATM cell groups stored in each of said input buffers is greater then said weight and an allowable cycle of said second cell group is not "0", discard all cells in said first cell group and transfer the same number of cells in said second cell group as said weight to said output buffer via said multiplexer.

7. The apparatus as set forth in claim 4, wherein said ATM processor is adapted to, if said delay time required by said earliest cell in said first ATM cell group stored in each of said input buffers is greater than said allowable delay time required by each of said input buffers, the number of cells in a second one of said ATM cell groups stored in each of said input buffers is greater than said weight and an allowable cycle of said second cell group is "0", discard all cells in said first cell group and transfer the same number of cells in said second cell group as "said weight+a reserved counter value indicative of arrival of a first cell of said second cell group" to said output buffer via said multiplexer.

8. The apparatus as set forth in claim 4, wherein said ATM processor is adapted to, if said delay time required by said earliest cell in said first ATM cell group stored in each of said input buffers is greater than said allowable delay time required by each of said input buffers and the number of cells in a second one of said ATM cell groups stored in each of said input buffers is smaller than or equal to said weight, discard all cells in said first cell group and transfer all cells in said second cell group and then the same number of cells in a third one of said ATM cell groups stored in each of said input buffers as a remainder of said weight to said output buffer via said multiplexer.

9. The apparatus as set forth in claim 1, wherein said ATM processor is adapted to, if the number of cells in said first cell group stored in each of said input buffers is greater then said weight and an allowable cycle of said first cell group is "0",transfer the same number of cells in said first cell group as "said weight+a reserved counter value indicative of arrival of a first cell of said first cell group" to said output buffer via said multiplexer.

10. A method for DBWRR (Delay Bound Weighted Round Robin) cell scheduling in an ATM (Asynchronous Transfer Mode) switch, comprising the steps of:
(a) allowing a queuing module to receive high-speed ATM cells, group the received ATM cells according to scheduling cycles on a link basis and store the resulting ATM cell groups in a specific one of a plurality of input buffers;
(b) allowing an ATM processor to store cell scheduling information about said ATM cell groups stored in the specific input buffer, in a specific one of a plurality of ATM cell scheduling tables, corresponding to said specific input buffer;
(c) allowing said ATM processor to recognize the cell scheduling information about a first one of said ATM cell groups stored in said specific input buffer, from said specific ATM cell scheduling table;
(d) allowing said ATM processor to calculate a delay time required by an earliest cell in said first ATM cell group stored in said specific input buffer and an allowable delay time required by said specific input buffer;
(e) allowing said ATM processor to determine how to process cell transfer scheduling for said first cell group stored in said specific input buffer on the basis of said ATM cell scheduling information about said first cell group stored in said specific ATM cell scheduling table, said delay time required by said earliest cell in said first cell group and said allowable delay time required by said specific input buffer, and then process the cell transfer scheduling for said first cell group in accordance with the determination result; and
(f) allowing said ATM processor to update said ATM cell scheduling information about said first cell group stored in said specific ATM cell scheduling table in such a manner that it is appropriate to a current cell group transfer process.

11. The method as set forth in claim 10, wherein said cell scheduling information about said ATM cell groups includes the number of cells and an allowable cycle of each of said ATM cell groups, and a reserved counter value indicative of arrival of a first cell of each of said ATM cell groups.

12. The method as set forth in claim 10, further comprising the step of:
(g) allowing said ATM processor to, if it is determined at said step (e) that said delay time required by said earliest cell in said first ATM cell group stored in said specific input buffer is less than or equal to said allowable delay time required by said specific input buffer, the number of cells in said first cell group is greater than a weight and an allowable cycle of said first cell group is not "0", transfer the same number of cells in said first cell group as said weight to an output buffer via a multiplexer.

13. The method as set forth in claim 10, further comprising the step of:
(g) allowing said ATM processor to, if it is determined at said step (e) that the number of cells in said first cell group stored in said specific input buffer is greater than a weight and an allowable cycle of said first cell group is "0", transfer the same number of cells in said first cell group as "said weight+a reserved counter value indicative of arrival of a first cell of said first cell group" to an output buffer via a multiplexer.

14. The method as set forth in claim 10, further comprising the step of:
(g) allowing said ATM processor to, if it is determined at said step (e) that the number of cells in said first cell group stored in said specific input buffer is smaller than or equal to a weight, transfer all cells in said first cell group and then the same number of cells in a second one of said ATM cell groups stored in said specific input buffer as a remainder of said weight to an output buffer via a multiplexer.

15. The method as set forth in claim 10, further comprising the step of:

(g) allowing said ATM processor to, if it is determined at said step (e) that said delay time required by said earliest cell in said first ATM cell group stored in said specific input buffer is greater than said allowable delay time required by said specific input buffer, the number of cells in a second one of said ATM cell groups stored in said specific input buffer is greater than a weight and an allowable cycle of said second cell group is not "0", discard all cells in said first cell group and transfer the same number of cells in said second cell group as said weight to an output buffer via a multiplexer.

16. The method as set forth in claim 10, further comprising the step of:

(g) allowing said ATM processor to, if it is determined at said step (e) that said delay time required by said earliest cell in said first ATM cell group stored in said specific input buffer is greater than said allowable delay time required by said specific input buffer, the number of cells in a second one of said ATM cell groups stored in said specific input buffer is greater than a weight and an allowable cycle of said second cell group is "0", discard all cells in said first cell group and transfer the same number of cells in said second cell group as "said weight+a reserved counter value indicative of arrival of a first cell of said second cell group" to an output buffer via a multiplexer.

17. The method as set forth in claim 10, further comprising the step of:

(g) allowing said ATM processor to, if it is determined at said step (e) that said delay time required by said earliest cell in said first ATM cell group stored in said specific input buffer is greater than said allowable delay time required by said specific input buffer and the number of cells in a second one of said ATM cell groups stored in said specific input buffer is smaller than or equal to a weight, discard all cells in said first cell group and transfer all cells in said second cell group and then the same number of cells in a third one of said ATM cell groups stored in said specific input buffer as a remainder of said weight to an output buffer via a multiplexer.

18. The method as set forth in claim 10, wherein said step (d) includes the step of allowing said ATM processor to calculate said delay time required by said earliest cell in said first ATM cell group stored in said specific input buffer on the basis of the below equation:

$$QD' = (k-c_1)W - (RC - RC_1)$$

where, k is a period in which cells in each ATM cell group must be processed, $c_1$ is an allowable cycle of a cell group being currently serviced, W is time ($10\delta$) required in processing cells associated with weights of all input buffers, RC is a reserved counter value when each ATM cell group has arrived at a corresponding input buffer, and $RC_1$ is a reserved counter value when a first cell of each ATM cell group has arrived at a corresponding input buffer.

19. The method as set forth in claim 10, wherein said step (d) includes the step of allowing said ATM processor to calculate said allowable delay time required by said specific input buffer on the basis of the below equation:

$$D_1 = kW + \alpha (0 \leq \alpha \leq W)$$

where, k is a period in which cells in each ATM cell group must be processed, and W is time ($10\delta$) required in processing cells associated with weights of all input buffers.

* * * * *